(12) United States Patent
Snell et al.

(10) Patent No.: US 11,713,424 B2
(45) Date of Patent: Aug. 1, 2023

(54) USE OF AROMAX® CATALYST IN SULFUR CONVERTER ABSORBER AND ADVANTAGES RELATED THERETO

(71) Applicant: Chevron Phillips Chemical Company LP, The Woodlands, TX (US)

(72) Inventors: Ryan W. Snell, Jubail Industrial (SA); Scott G. Morrison, Kingwood, TX (US); Vincent D. McGahee, Kemah, TX (US); Xianghong Hao, Kingwood, TX (US); Gabriela Alvez-Manoli, Kingwood, TX (US)

(73) Assignee: Chevron Phillips Chemical Company, LP, The Woodlands, TX (US)

( * ) Notice: Subject to any disclaimer, the term of this patent is extended or adjusted under 35 U.S.C. 154(b) by 242 days.

(21) Appl. No.: 15/896,507

(22) Filed: Feb. 14, 2018

(65) Prior Publication Data

US 2019/0249094 A1  Aug. 15, 2019

(51) Int. Cl.
*C10G 61/00* (2006.01)
*C10G 61/06* (2006.01)
(Continued)

(52) U.S. Cl.
CPC ......... *C10G 61/06* (2013.01); *B01D 53/1468* (2013.01); *B01J 29/62* (2013.01); *B01J 37/0201* (2013.01); *C10G 35/04* (2013.01); *C10G 45/02* (2013.01); *C10G 59/02* (2013.01); *C10G 61/02* (2013.01); *C10G 69/08* (2013.01); *B01D 2257/304* (2013.01); *C10G 2300/202* (2013.01); *C10G 2300/207* (2013.01);
(Continued)

(58) Field of Classification Search
CPC ........ C10G 61/06; C10G 59/02; C10G 65/02; C10G 65/04; C10G 65/046; C10G 67/02; C10G 67/06; C10G 35/04; C10G 35/24
See application file for complete search history.

(56) References Cited

U.S. PATENT DOCUMENTS 2,969,318 A   1/1961  Woodall, Jr.
3,249,405 A   5/1966  Waddill
(Continued)

OTHER PUBLICATIONS

Saint-Gobain, MacroTrap Guard Bed Media (Year: 2017).*
(Continued)

*Primary Examiner* — Prem C Singh
*Assistant Examiner* — Brandi M Doyle
(74) *Attorney, Agent, or Firm* — Brandon N. Hudder

(57) ABSTRACT

A process for operating a reforming system by operating a reforming section containing a plurality of reactors, wherein each of the plurality of reactors containing a reforming catalyst capable of catalyzing the conversion of at least a portion of the hydrocarbons in a treated hydrocarbon stream into a reactor effluent comprising aromatic hydrocarbons, and operating a sulfur guard bed (SGB) to remove sulfur and sulfur-containing hydrocarbons from a hydrocarbon feed to provide the treated hydrocarbon stream, where the SGB contains at least a layer of a SGB catalyst comprising the same catalyst as the reforming catalyst, and where each reactor of the plurality of reactors within the reforming section may be operated at a higher operating temperature than an operating temperature of the SGB. A system for carrying out the process is also provided.

20 Claims, 3 Drawing Sheets

(51) Int. Cl.
*C10G 35/04* (2006.01)
*C10G 45/02* (2006.01)
*C10G 69/08* (2006.01)
*B01D 53/14* (2006.01)
*C10G 59/02* (2006.01)
*B01J 29/62* (2006.01)
*B01J 37/02* (2006.01)
*C10G 61/02* (2006.01)

(52) U.S. Cl.
CPC ............... *C10G 2300/4006* (2013.01); *C10G 2300/4031* (2013.01); *C10G 2300/70* (2013.01); *C10G 2300/701* (2013.01); *C10G 2400/30* (2013.01)

(56) References Cited

U.S. PATENT DOCUMENTS

| | | | | |
|---|---|---|---|---|
| 4,113,606 | A | * | 9/1978 | Mulaskey ............... C10G 29/04 208/244 |
| 4,456,527 | A | | 6/1984 | Buss et al. |
| 4,615,796 | A | * | 10/1986 | Kramer ................ B01J 8/0085 208/146 |
| 4,741,819 | A | | 5/1988 | Robinson et al. |
| 4,940,532 | A | | 7/1990 | Peer et al. |
| 5,059,304 | A | | 10/1991 | Field |
| 5,196,631 | A | | 3/1993 | Murakawa et al. |
| 5,211,837 | A | | 5/1993 | Russ |
| 5,316,992 | A | | 5/1994 | Russ et al. |
| 5,322,615 | A | | 6/1994 | Holtermann et al. |
| 5,389,235 | A | | 2/1995 | Russ et al. |
| 5,401,365 | A | | 3/1995 | Chen et al. |
| 5,401,386 | A | | 3/1995 | Morrison et al. |
| 5,507,939 | A | | 4/1996 | Russ et al. |
| 5,518,607 | A | * | 5/1996 | Field ..................... C10G 59/02 134/2 |
| 5,520,798 | A | | 5/1996 | Innes |
| 5,527,750 | A | | 6/1996 | Haun |
| 5,585,075 | A | | 12/1996 | Takano et al. |
| 5,601,698 | A | * | 2/1997 | Innes .................. C10G 35/095 208/134 |
| 5,611,914 | A | | 3/1997 | Prince et al. |
| 5,614,082 | A | | 3/1997 | Russ et al. |
| 5,866,743 | A | | 2/1999 | Heyse et al. |
| 6,190,539 | B1 | | 2/2001 | Holtermann et al. |
| 6,207,042 | B1 | | 3/2001 | Holtermann et al. |
| 6,406,614 | B1 | | 6/2002 | Tiedtke et al. |
| 6,518,470 | B1 | | 2/2003 | Fukunaga et al. |
| 6,548,030 | B2 | | 4/2003 | Heyse et al. |
| 6,812,180 | B2 | | 11/2004 | Fukunaga |
| 7,153,801 | B2 | | 12/2006 | Wu |
| 7,544,335 | B2 | | 6/2009 | Scanlon et al. |
| 7,582,272 | B2 | | 9/2009 | Glova et al. |
| 7,687,673 | B2 | | 3/2010 | Ablin |
| 7,932,425 | B2 | | 4/2011 | Blessing et al. |
| 8,119,203 | B2 | | 2/2012 | Hise et al. |
| 8,716,161 | B2 | | 5/2014 | Wu |
| 8,912,108 | B2 | | 12/2014 | Wu |
| 9,085,736 | B2 | | 7/2015 | Morrison et al. |
| 2002/0065443 | A1 | | 5/2002 | Williams et al. |
| 2004/0192862 | A1 | | 9/2004 | Glover |
| 2013/0109897 | A1 | * | 5/2013 | Morrison ............... C10G 35/04 585/400 |
| 2013/0158320 | A1 | | 6/2013 | Mosier et al. |
| 2013/0203179 | A1 | * | 8/2013 | Vincent ................. C10G 61/00 436/147 |

OTHER PUBLICATIONS

Saint-Gobain NorPro "MacroTrap® XPore 80 Guard Bed Media," 2011, 2 pages.
International Search Report & Written Opinion PCT/US2019/018099, dated Apr. 25, 2019, 13 pages.

* cited by examiner

USE OF AROMAX® CATALYST IN SULFUR CONVERTER ABSORBER AND ADVANTAGES RELATED THERETO

CROSS-REFERENCE TO RELATED APPLICATIONS

None.

FIELD OF THE INVENTION

This disclosure relates generally to a system and method for operating a catalytic reforming process; more particularly, this disclosure relates to a system and method for sulfur removal from a hydrocarbon feed to the catalytic reforming process; still more particularly, this disclosure relates to a system and method for sulfur removal from a reformer feed utilizing reforming catalyst.

BACKGROUND

The catalytic conversion of a hydrocarbon feed into aromatic compounds, referred to as aromatization or reforming, is an important industrial process. Reforming reactions are intended to convert paraffins, naphthenes, and olefins to aromatics and hydrogen. The reforming process encompasses a number of reactions, which are typically carried out in the presence of a catalyst, such as dehydrocyclization, hydrodecyclization, isomerization, hydrogenation, dehydrogenation, hydrocracking, cracking, etc. Typical reforming processes can be carried out using a variety of reactors containing reforming or 'aromatization' catalysts. The catalyst may increase the reaction rates, production of desired aromatic product(s), and/or throughput rates for the desired aromatic compounds. Conventionally, a hydrocarbon feed to a catalytic reforming process is combined with hydrogen before feeding it to a first reactor in a reforming section comprising a plurality of (e.g., six or seven) reforming reactors. As the hydrocarbon feed passes through the reforming section, the reaction progresses, thus generating aromatic products and hydrogen in each of the plurality of reactors.

A variety of catalysts are used to carry out the reforming reaction, all of which are subject to deactivation over time. For example, catalyst deactivation can result from poisoning, carbon deposit formation, or other similar processes. The reforming process can include a variety of process units to remove catalyst poisons. For example, a reforming process can include a sulfur removal system to remove sulfur and sulfur-containing hydrocarbons from the hydrocarbon feed. By removing the sulfur and sulfur-containing hydrocarbons from the hydrocarbon feed prior to contacting the treated hydrocarbon stream with the reforming catalyst, the catalyst life can be extended.

Upon the eventual deactivation of the catalyst, the catalyst is removed from a reactor and replaced with fresh catalyst. The catalyst replacement process typically involves a complete reforming process shutdown during the replacement period. This period can be extensive (e.g., thirty to sixty days) due to the time necessary to physically replace the catalyst followed by any additional time necessary to pretreat the catalyst in-situ. The catalyst replacement cost can also be a major economic driver for the reforming process. A complete reforming process shutdown can also be required for mandatory inspections of equipment and safety systems. As a result, operators of reforming processes have sought to extend the useful life of the reforming catalysts, limit the loss of production associated with shutdowns, and allow for operational flexibility.

Given the commercial importance of catalytic reforming, an ongoing need exists for improved systems and methods therefor.

SUMMARY

Disclosed herein is a process for operating a reforming system, the process comprising: operating a reforming section, wherein the reforming section comprises a plurality of reactors, and wherein each of the plurality of reactors contains a reforming catalyst capable of catalyzing the conversion of at least a portion of the hydrocarbons in a treated hydrocarbon stream into a reactor effluent comprising aromatic hydrocarbons; and operating a sulfur guard bed (SGB) to remove sulfur and sulfur-containing hydrocarbons from a hydrocarbon feed to provide the treated hydrocarbon stream, wherein the SGB contains at least a layer of a SGB catalyst, wherein the layer of the SGB catalyst comprises the same catalyst as the reforming catalyst and is capable of producing hydrogen sulfide from sulfur-containing hydrocarbons and hydrogen, wherein each reactor of the plurality of reactors within the reforming section is operated at a higher operating temperature than an operating temperature of the SGB.

Also disclosed herein is a reforming system comprising a reforming section, wherein the reforming section comprises a plurality of reactors, and wherein each of the plurality of reactors contains a reforming catalyst capable of catalyzing the conversion of at least a portion of the hydrocarbons in a treated hydrocarbon stream into a reactor effluent comprising aromatic hydrocarbons; and a sulfur guard bed (SGB) operable to remove sulfur and sulfur-containing hydrocarbons from a hydrocarbon feed to provide the treated hydrocarbon stream, wherein the SGB contains at least a layer of a SGB catalyst, wherein the SGB catalyst is the same catalyst as the reforming catalyst and is capable of producing hydrogen sulfide from sulfur-containing hydrocarbons and hydrogen, and wherein the SGB has a volume that is from about 2 vol. % to about 40 vol. % of the volume of the total reforming catalyst within the plurality of reforming reactors within the reforming section.

Also disclosed herein is a process for operating a reforming system comprising a reforming section, wherein the reforming section comprises a plurality of reactors, and wherein each of the plurality of reactors contains a reforming catalyst capable of catalyzing the conversion of at least a portion of the hydrocarbons in a treated hydrocarbon stream into a reactor effluent comprising aromatic hydrocarbons; and a sulfur guard bed (SGB) operable to remove sulfur and sulfur-containing hydrocarbons from a hydrocarbon feed to provide the treated hydrocarbon stream, wherein the SGB contains at least a layer of a SGB catalyst that is the same catalyst as the reforming catalyst, the process comprising: operating the reforming system to convert hydrocarbons in the treated hydrocarbon stream into the reactor effluent containing aromatic hydrocarbons; upon identifying one or more operating parameters that indicate a need to perform maintenance on the reactor system, shutting down the reforming system to cease conversion of the hydrocarbons in the treated hydrocarbon stream into the aromatic hydrocarbons; removing and replacing the reforming catalyst in the plurality of reactors and removing and replacing the SGB catalyst in the SGB; concurrently reducing the replaced SGB catalyst and the fresh reforming catalyst prior to start-up of the reforming system; and starting up the reforming system to continue conversion of the hydrocarbons in the treated hydrocarbon stream into the aromatic hydrocarbons.

BRIEF DESCRIPTION OF THE DRAWINGS

The following figures illustrate embodiments of the subject matter disclosed herein. The claimed subject matter may be understood by reference to the following description taken in conjunction with the accompanying figures, in which like reference numerals identify like elements, unless otherwise indicated, and in which:

DETAILED DESCRIPTION

Figure 1:
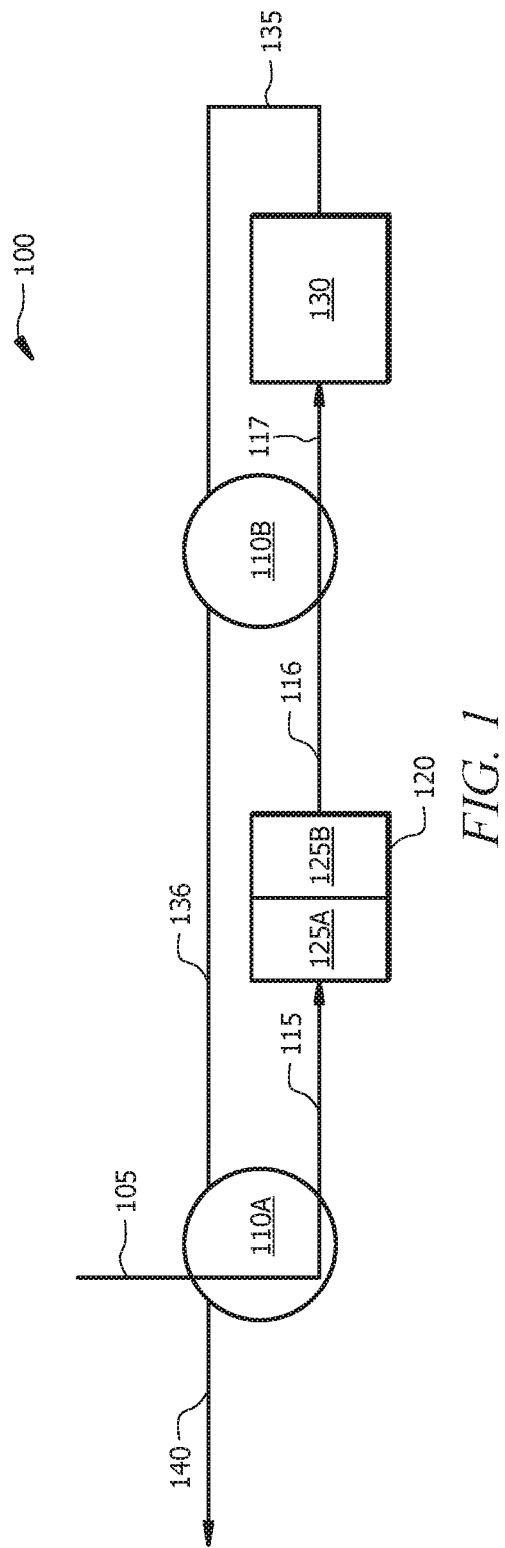
FIG. 1 is a schematic of a reforming system according to an embodiment of the present disclosure.

Reforming or 'aromatization' processes, such as the AROMAX® Process developed by Chevron Phillips Chemical Company LP, The Woodlands, Tex., can convert a light C6-C8 naphtha hydrocarbon feed selectively to BTX (benzene, toluene, and xylenes). The hydrocarbon feed generally contains compounds such as n-hexane, n-heptane, methyl hexane, etc., which have a six carbon chain available to ring close and subsequently form the benzene, toluene, or xylene.

As is generally understood, a reforming "reaction", typically takes place within a reforming "reactor." As used herein, the terms "restore" and "restoring" may be used to refer to regeneration of a catalyst, rejuvenation of a catalyst, and/or replacement of a catalyst with fresh catalyst. The terms "restore" and "restoring" may also be used to refer to the inspection of reactors, reactor internals, or reactor safety devices. The reactors employed in the reforming section and the processes described herein may be any conventional type of reactor that maintains a catalyst within the reactor and can accommodate a continuous flow of hydrocarbons. The reforming section and the processes described herein may comprise a fixed catalyst bed system, a moving catalyst bed system, a fluidized catalyst bed system, or combinations thereof. Suitable reactors may include, but are not limited to, fixed bed reactors including radial flow reactors, bubble bed reactors, or ebullient bed reactors. The flow of the hydrocarbon feed can be upward, downward, or radially through the reactor. In various embodiments, the reforming systems described herein may be operated as an adiabatic reactor system or an isothermal reactor system. As used herein, a "hydrocarbon", for example a "hydrocarbon feed", comprises hydrocarbons, though components other than molecules comprising hydrogen and carbon may be present in the stream (e.g., hydrogen gas, trace moisture).

Reforming catalysts which are highly selective for converting light naphtha into aromatics, such as the AROMAX® Catalyst comprising platinum (Pt), and at least one halide supported on zeolitic support, may also be very sensitive to poisons such as sulfur and sulfur-containing hydrocarbons. The performance of such catalysts decreases with exposure to such catalyst poisons. For this reason, reforming plants may employ a sulfur removal system upstream of the reforming reactors. Such a sulfur removal system may be operable to ensure that the reforming catalyst in the reforming reactors is exposed to very little sulfur, e.g., less than 5 ppb sulfur in the hydrocarbon feed to the reforming reactors.

The sulfur removal system may comprise, for example, a naphtha hydrotreater, a sulfur converter adsorber (SCA), or combinations thereof. The SCA may comprise a first or upstream component (e.g., platinum supported on alumina) operable as a sulfur converter to break down sulfur-containing hydrocarbons with hydrogen, for example into hydrogen sulfide ($H_2S$) via contact with hydrogen, and a second or downstream component (e.g., potassium on alumina) operable as a sulfur adsorber to adsorb the hydrogen sulfide and thus remove it from the hydrocarbon feed introduced into the downstream reforming reactors. Such a sulfur removal system is described, for example, in U.S. Pat. No. 5,518,607, the disclosure of which is hereby incorporated herein by reference in its entirety for purposes not contrary to this disclosure.

Although an upstream naphtha hydrotreater may obviate the need for an SCA during normal operations, such an SCA may be maintained for risk mitigation. However, the construction and use of a SCA has drawbacks. For example, during turnarounds, the SCA must be reduced on its own due to the different materials loaded therein, and so as to not send undesirable species to the downstream reforming reactors; this reduction may result in significant downtime and turnaround costs. Furthermore, over time, the SCA pellets can break down and become fines; this may result in increased pressure drop and compressor costs. Additionally, the maximum temperature of the SCA may be limited, e.g., to about 600° F. (316° C.). If temperatures higher than this are encountered, the catalysts (of the sulfur converter and/or the sulfur adsorber) may promote cracking, which lowers product values. This maximum temperature limit causes two problems: it lowers the potential rate of hydrodesulfurization, which would occur faster at higher temperatures, and it results in the hydrogenation of existing aromatic species. The molecules that become hydrogenated in the SCA must be dehydrogenated/re-aromatized in the first reforming reactor, increasing duty requirements on a furnace of the second downstream furnace/reactor pair and reducing catalyst lifetimes and overall throughput. Another drawback of SCA use is that, other than sulfur breakthrough to the downstream reforming reactor beds, determination of the extent of sulfur loading of the SCA is difficult, thus increasing the risk of an upset.

This disclosure provides a system and method for the removal of sulfur and sulfur-containing hydrocarbons as well as other poisons from a hydrocarbon feed to be reformed. The system and method provide for sulfur removal utilizing a sulfur guard bed employing the same reforming catalyst composition employed in the downstream reforming reactors. In this manner, in embodiments, the sulfur-removal system can be co-reduced with the downstream reforming reactors, thus minimizing or reducing downtime and turnaround costs, the production of fines, and/or increased pressure drop over the sulfur-removal system utilizing the SCA. In embodiments, the change in temperature across the sulfur guard bed can be monitored via the herein disclosed system and method, to determine the extent of sulfur loading thereof, thus allowing for facile determination of catalyst sulfur loading and decreasing the risk of a process upset. According to embodiments of this disclosure, the sulfur guard bed can be operated at a temperature above which aromatic species are hydrogenated, for example, to naphthenes, thus minimizing the number of hydrocarbon feed molecules hydrogenated in the sulfur-removal apparatus (when compared to the SCA) that must subsequently be dehydrogenated in the first downstream reforming reactor. Utilization of a higher temperature in the sulfur guard bed will also increase the rate of hydrodesulfurization, in embodiments. In embodiments, the sulfur guard bed is operated at a temperature below the operating temperature of the downstream reforming reactors.

A reforming system according to this disclosure comprises a reforming section downstream of a specific sulfur removal system referred to herein as a sulfur guard bed (SGB), and may further comprise one or more feed/effluent heat exchangers configured to adjust the temperature of a hydrocarbon feed to be reformed via heat exchange with an effluent of the reforming section. A detailed description of these components and methods of operating same will be provided hereinbelow with reference to FIGS. 1, 2, and 3.

Description of a system and method according to embodiments of this disclosure will now be made with reference to FIG. 1. FIG. 1 is a schematic of a reforming system 100 according to an embodiment of the present disclosure. Reforming system 100 comprises a reforming section 130, a SGB 120, a hot feed/effluent heat exchanger 110B, and a cold feed/effluent heat exchanger 110A. At the inlet of the process, a hydrocarbon feed is introduced via a hydrocarbon feed line 105 (and likewise hydrocarbon feed lines 205 and 305 described herein).

Various hydrocarbon feeds may be suitable for use with reforming processes and generally comprise non-aromatic hydrocarbons. The hydrocarbon feed to the reforming system comprising an aromatization system can be a mixture of hydrocarbons comprising $C_6$ to $C_8$ hydrocarbons containing up to about 10 wt % and alternatively up to about 15 wt % of $C_5$ and lighter hydrocarbons ($C_5^-$) and containing up to about 10 wt % of $C_9$ and heavier hydrocarbons ($C_9^+$). Suitable hydrocarbon feeds include hydrocarbons boiling within the 70° F. (21.1° C.) to 450° F. (232.2° C.) temperature range, alternatively from about 120° F. (48.9° C.) to about 400° F. (204.4° C.).

The hydrocarbon feed comprises convertible hydrocarbons, such as aliphatic, alicyclic, and/or naphthenic hydrocarbons. As utilized herein, 'convertible' hydrocarbons include hydrocarbons having six or seven carbon atoms without an internal quaternary carbon, and hydrocarbons having six carbon atoms without two adjacent internal tertiary carbons. Such convertible hydrocarbons may comprise methylpentanes, methylhexanes, dimethylpentanes, and mixtures thereof. The convertible components may include 2-methylpentane, 3-methylpentane, 2,4-dimethylpentane, 2,3-dimethylpentane, n-hexane, 2-methylhexane, 3-methylhexane, n-heptane, and mixtures thereof. As utilized herein, 'nonconvertible' hydrocarbons include highly branched hydrocarbons comprising six or seven carbon atoms with an internal quaternary carbon, and hydrocarbons having six carbon atoms and two adjacent tertiary carbons. The highly branched hydrocarbons include dimethylbutanes (DMBs), trimethylbutanes, dimethylpentanes, and mixtures thereof. The highly branched hydrocarbons with six or seven carbon atoms with an internal quaternary carbon may comprise, for example, 2,2-dimethylbutane, 2,2-dimethylpentane, 3,3-dimethylpentane, 2,2,3-trimethylbutane, or combinations thereof. The highly branched hydrocarbons with six carbon atoms and an adjacent internal tertiary carbon atom may comprise 2,3-dimethylbutane. The highly branched hydrocarbons do not easily convert to aromatic products and instead tend to convert to light hydrocarbons. As used herein, 'unreacted' hydrocarbon refers to convertible hydrocarbon that has passed through a reforming reactor series without being converted into aromatic hydrocarbons.

In embodiments, the hydrocarbon feed has a sulfur content ranging from less than 200 ppbw, alternatively less than 100 ppbw, alternatively from about 10 parts per billion by weight (ppbw) to about 100 ppbw. Examples of suitable hydrocarbon feeds include straight-run naphthas from petroleum refining or fractions thereof which have been hydrotreated to remove sulfur and sulfur-containing hydrocarbons as well as other catalyst poisons. Also suitable are synthetic naphthas or naphtha fractions derived from other sources such as coal, natural gas, or from processes such as Fischer-Tropsch processes, fluid catalytic crackers, and hydrocrackers. While not shown in FIG. 1, various upstream hydrocarbon pretreatment steps may be used to prepare the hydrocarbon feed for the reforming process. For example, hydrotreating may be used to remove catalyst poisons such as sulfur and sulfur-containing hydrocarbons. Contacting the hydrocarbon feed with a massive nickel catalyst, for example, prior to the reforming reaction may also protect against failure of the hydrotreating system. In embodiments, the hydrocarbon feed passing through the hydrocarbon feed line 105 (or hydrocarbon feed lines 205 or 305) comprises a recycle stream from downstream separations, which may contain hydrogen.

The hydrocarbon feed can be introduced into cold feed/effluent heat exchanger 110A via hydrocarbon feed line 105. Within the cold feed/effluent heat exchanger 110A, the temperature of the hydrocarbon feed is increased via heat exchange with the reformer effluent introduced thereto via the reformer effluent line 135 and the hot feed/effluent heat exchanger effluent outlet line 136.

The heated hydrocarbon feed is introduced via the cold feed/effluent heat exchanger outlet line 115 into the SGB 120. The SGB 120 is operable to reduce the amount of sulfur and sulfur-containing hydrocarbons in the hydrocarbon feed, to provide a treated hydrocarbon stream. The SGB 120 may also act as a precaution or backup in case any upstream hydrotreating system fails or has an operating upset. The SGB according to this disclosure contains at least a layer of a SGB catalyst, wherein the SGB catalyst comprises the same catalyst composition as the reforming catalyst utilized in the reforming section 130 (and described further hereinbelow). The SGB 120 may comprise one or more vessels or layers that allow the hydrocarbon feed to pass as a fluid therethrough. The SGB catalyst may act as (i) a sulfur converter capable of producing hydrogen sulfide from hydrogen and sulfur-containing hydrocarbons in the hydrocarbon feed; (ii) a sulfur adsorber, capable of adsorbing hydrogen sulfide; or (iii) both (i) and (ii). In embodiments, as indicated in FIG. 1, the SGB comprises a first bed or layer 125A, and further comprises a second bed or layer 125B. Suitable layers will be described further hereinbelow. The SGB may comprise a radial or axial flow fixed bed reactor.

A treated hydrocarbon stream is removed from the SGB 120 via the SGB outlet line 116. The treated hydrocarbon stream may comprise less than 500, 300, or 100 ppb sulfur. In embodiments, the treated hydrocarbon steam comprises from about 1 to about 500 ppb sulfur, from about 5 to about 300 ppb sulfur, or from about 20 to about 100 ppb sulfur.

The treated hydrocarbon stream may pass through a second or a hot feed/effluent heat exchanger 110B, wherein the temperature thereof may be increased via heat exchange with the hot reformer effluent produced in reforming section 130, and introduced into hot feed/effluent heat exchanger 110B via the reformer effluent line 135.

The heated, treated hydrocarbon stream may be introduced via the hot feed/effluent heat exchanger hydrocarbon feed outlet line 117 into the reforming section 130. The reforming section 130 comprises a plurality of reforming reactors in series. Each of the plurality of reforming reactors contains a reforming catalyst capable of catalyzing the conversion of at least a portion of the convertible hydrocarbons in the treated hydrocarbon stream into a reactor effluent comprising aromatic hydrocarbons, which leaves via reformer effluent line 135.

The reformer effluent can be introduced via reformer effluent line 135 into the hot feed/effluent heat exchanger 110B, and subsequently, via the hot feed/effluent heat exchanger effluent outlet line 136, into the cold feed/effluent heat exchanger 110A, prior to leaving the reforming system 100 via reformer product line 140.

In embodiments, the hot feed/effluent heat exchanger is upstream of the SGB. Such an embodiment will now be described further with reference to FIG. 2, which is a schematic of a reforming system 200, according to an embodiment of this disclosure. Reforming system 200 comprises a cold feed/effluent heat exchanger 210A, a hot feed/effluent heat exchanger 210B, a SGB 220, and a reforming section 230. In this embodiment, the hydrocarbon feed in line 205 passes through the cold feed/effluent heat exchanger 210A and the hot feed/effluent heat exchanger 210B, prior to introduction into the SGB 220.

In this embodiment, the hydrocarbon feed introduced into the cold feed/effluent heat exchanger 210A via hydrocarbon feed line 205 is heated via the heat exchange therein with cooled reformer effluent introduced thereto via the hot feed/effluent heat exchanger effluent outlet line 236. The hydrocarbon feed is then introduced via the cold feed/effluent heat exchanger hydrocarbon feed outlet line 215 into the hot feed/effluent heat exchanger 210B. Within the hot feed/effluent heat exchanger 210B, the temperature of the hydrocarbon feed is further increased via heat exchange with hot reformer effluent introduced into the hot feed/effluent heat exchanger 210B via reformer effluent line 235. Heated hydrocarbon feed may be introduced via the hot feed/effluent heat exchanger hydrocarbon feed outlet line 217 into the SGB 220.

Figure 2:
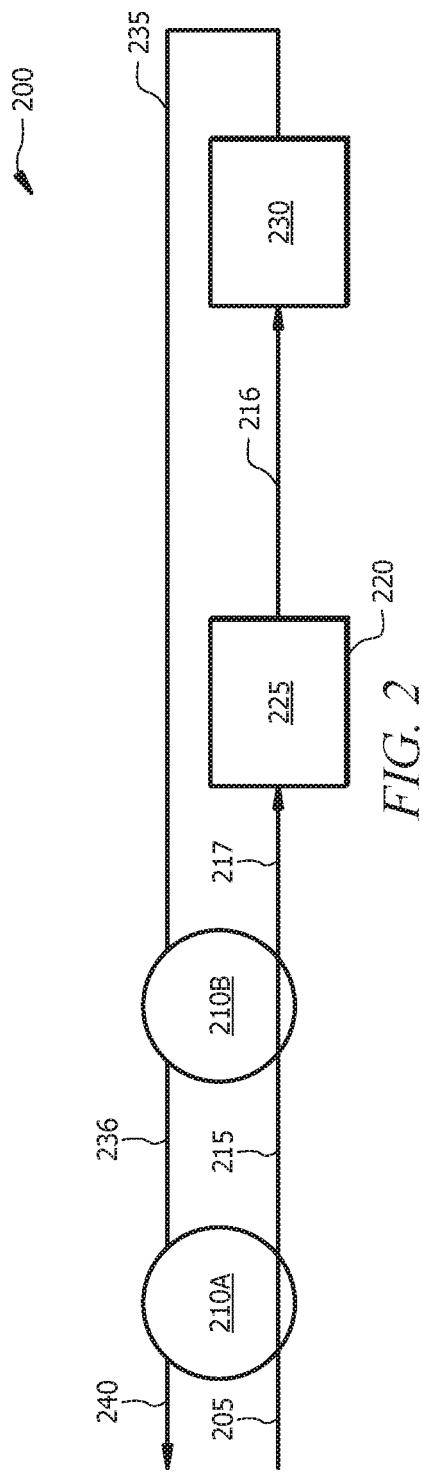
FIG. 2 is a schematic of a reforming system according to another embodiment of the present disclosure.

Within the SGB 220, sulfur and sulfur-containing hydrocarbons are removed from the hydrocarbon feed, and a treated hydrocarbon stream is removed from the SGB 220 via SGB outlet line 216. As noted above with reference to the embodiment of FIG. 1, and discussed further hereinbelow, the SGB can comprise a layer of or be entirely a SGB catalyst. In the embodiment of FIG. 2, the SGB 220 comprises a single layer or bed 225 of the SGB catalyst as described hereinbelow. The treated hydrocarbon stream is introduced to the reforming section 230 via SGB outlet line 216. The treated hydrocarbon stream is reformed within the reforming section 230, as described further hereinbelow, and the reformer effluent therefrom via reformer effluent line 235. The reformer effluent can be introduced via reformer effluent line 235 into the hot feed/effluent heat exchanger 210B, and subsequently, via the hot feed/effluent heat exchanger effluent outlet line 236, into the cold feed/effluent heat exchanger 210A, prior to leaving the reforming system 200 via reformer product line 240.

Figure 3:
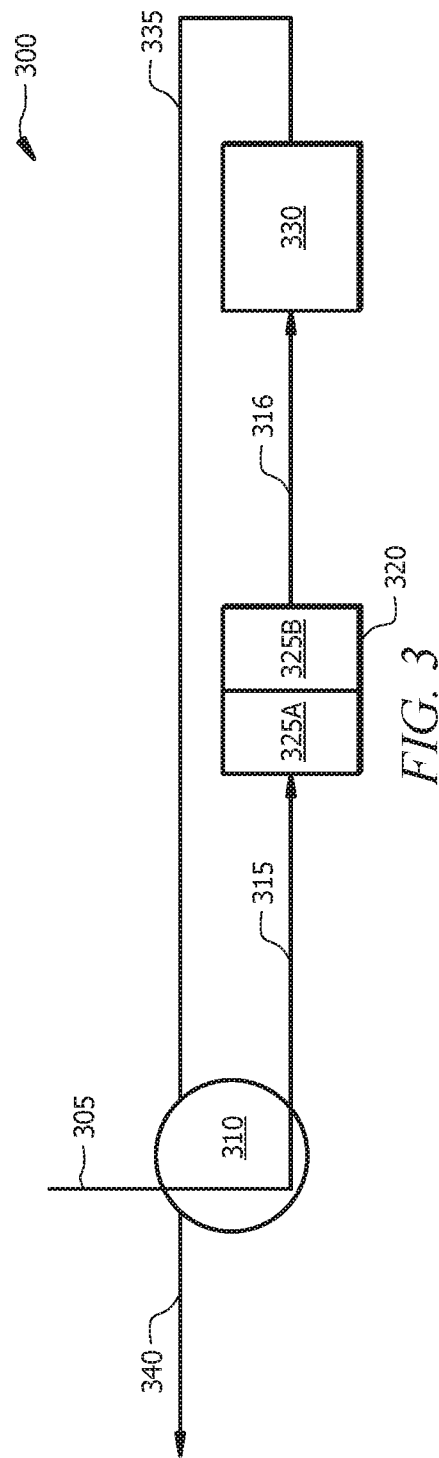
FIG. 3 is a schematic of a reforming system according to another embodiment of the present disclosure.

In alternative embodiments, a reforming system of this disclosure employs a single feed/effluent heat exchanger. Such a reforming system will now be described with reference to FIG. 3. FIG. 3 is a schematic of a reforming system 300, according to an embodiment of this disclosure. Reforming system 300 comprises a feed/effluent heat exchanger 310, a SGB 320, and a reforming section 330. In this embodiment, hydrocarbon feed introduced into the feed/effluent heat exchanger 310 via hydrocarbon feed line 305 is heated via heat exchange therein with the hot reformer effluent introduced thereto via reformer effluent line 335. Heated hydrocarbon feed exits the feed/effluent heat exchanger 310 and is introduced to the SGB 320 via the feed/effluent heat exchanger feed outlet line 315.

Within the SGB 320, sulfur and sulfur-containing hydrocarbons are removed from the heated hydrocarbon feed, and a treated hydrocarbon stream is removed from the SGB 320 via SGB outlet line 316. As noted above, the SGB can comprise a layer of or be entirely a SGB catalyst. In the embodiment of FIG. 3, the SGB 320 comprises a first layer or bed 325A of an iron trap material, as described hereinbelow, and a second layer or bed 325B of the SGB catalyst. The treated hydrocarbon stream is reformed within the reforming section 330, as described further hereinbelow, and reformer effluent extracted therefrom via reformer effluent line 335. As noted previously, reformer effluent can be introduced via reformer effluent line 335 into the feed/effluent heat exchanger 310 prior to leaving reforming system 300 via reformer product line 340.

The SGB 120/220/320 according to this disclosure comprises at least one layer of the SGB catalyst, wherein the SGB catalyst is the same composition as the reforming catalyst utilized downstream in the reforming reactors of the reforming section 130/230/330. For example, in embodiments, the SGB 120/220/320 according to this disclosure comprises a single bed or layer of the SGB catalyst. For example, in embodiments, the SGB 120/220/320 according to this disclosure comprises at least one layer of the SGB catalyst in combination with one or more additional layers of material (e.g., catalysts, absorbents, adsorbents, etc.). In embodiments, the SGB according to this disclosure comprises (i) a layer of the SGB catalyst and (ii) a layer comprising an adsorbent capable of adsorbing hydrogen sulfide, as described further below. In embodiments, the SGB according to this disclosure comprises (i) a layer of the SGB catalyst and (ii) layer comprising an iron trap material operable to remove particulate iron from the hydrocarbon feed, as described further below. In embodiments, the SGB according to this disclosure comprises (i) a layer of the SGB catalyst; (ii) a layer comprising an adsorbent capable of adsorbing hydrogen sulfide; and (iii) layer comprising an iron trap material operable to remove particulate iron from the hydrocarbon feed, as described further below.

The reforming reactors in the reforming section each contain a catalyst for carrying out a reforming process. According to this disclosure, the SGB may also contain at least a layer of this reforming catalyst. A suitable reforming catalyst is capable of converting at least a portion of aliphatic, alicyclic, and/or naphthenic hydrocarbons (e.g., non-aromatic hydrocarbons) in a hydrocarbon feed to aromatic hydrocarbons. Any catalyst capable of carrying out a reforming reaction may be used alone or in combination with additional catalytic materials in the reactors. Suitable catalysts may include acidic or non-acidic catalysts. In an embodiment, the catalyst is a non-acidic catalyst. A suitable non-acidic catalyst may comprise a non-acidic zeolitic support, at least one group VIII metal, and one or more halides. Suitable halides include chloride, fluoride, bromide, iodide, or combinations thereof. Suitable Group VIII metals include iron, cobalt, nickel, ruthenium, rhodium, palladium, osmium, iridium, platinum, or combinations thereof. Examples of catalysts suitable for use with the reforming system described herein are AROMAX® Catalysts available from the Chevron Phillips Chemical Company LP of The Woodlands, Tex., and those discussed in U.S. Pat. No. 6,812,180 to Fukunaga entitled "Method for Preparing Catalyst", U.S. Pat. No. 7,153,801 to Wu entitled "Aromatization Catalyst and Methods of Making and Using Same," U.S. Pat. No. 6,207,042 or 6,190,539 to Holtermann entitled "Reforming Using a Bound Halide Zeolite Catalyst", the disclosure of each of which is hereby incorporated herein by reference as if reproduced in its entirety.

The supports for the reforming catalysts can generally include any inorganic oxide. These inorganic oxides may include bound large pore aluminosilicates (zeolites), amorphous inorganic oxides and mixtures thereof. Zeolitic supports for catalysts can generally include any large pore aluminosilicates (zeolites), bound with amorphous inorganic oxides and mixtures thereof. Large pore aluminosilicates can include, but are not limited to, L-zeolite, Y-zeolite, mordenite, omega zeolite, beta zeolite, and the like. Amorphous inorganic oxides can include, but are not limited to, aluminum oxide, silicon oxide, and titania. Suitable binding agents for the inorganic oxides can include, but are not limited to, silica, alumina, clays, titania, and magnesium oxide. In some embodiments, the reforming catalyst may comprise at least one Group VIII metal and a zeolitic support. In yet further embodiments, the reforming catalyst may comprise platinum, alone or in combination with one or more of gold or rhenium and a zeolitic support comprising a silica-bound L-zeolite. In some embodiments, the reforming catalyst may comprise platinum, alone or in combination with one or more of gold or rhenium; at least one halogen; on a zeolitic support comprising a silica-bound L-zeolite.

Zeolite materials, both natural and synthetic, are known to have catalytic properties for many hydrocarbon processes. Zeolites typically are ordered porous crystalline aluminosilicates having a structure with cavities and channels interconnected by channels. The cavities and channels throughout the crystalline material generally can be of a size to allow selective reaction of hydrocarbons.

The term "zeolite" generally refers to a particular group of hydrated, crystalline metal aluminosilicates. These zeolites exhibit a network of $SiO_4$ and $AlO_4$ tetrahedra in which aluminum and silicon atoms are crosslinked in a three-dimensional framework by sharing oxygen atoms. In the framework, the ratio of oxygen atoms to the total of aluminum and silicon atoms may be equal to about 2. The framework exhibits a negative electrovalence that typically is balanced by the inclusion of cations within the crystal such as metals, alkali metals, alkaline earth metals, or hydrogen.

L-type zeolite catalysts are a sub-group of zeolitic catalysts. Typical L-type zeolites contain mole ratios of oxides in accordance with the following formula:

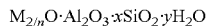

$M_{2/n}O \cdot Al_2O_3 \cdot xSiO_2 \cdot yH_2O$ wherein "M" designates at least one exchangeable cation such as barium, calcium, cerium, lithium, magnesium, potassium, sodium, strontium, and zinc as well as nonmetallic cations like hydronium and ammonium ions which may be replaced by other exchangeable cations without causing a substantial alteration of the basic crystal structure of the L-type zeolite. The "n" in the formula represents the valence of "M", "x" is 2 or greater; and "y" is the number of water molecules contained in the channels or interconnected voids with the zeolite. Bound potassium L-type zeolites, or KL zeolites, have been found to be particularly desirable. The term "KL zeolite" as used herein refers to L-type zeolites in which the principal cation M incorporated in the zeolite is potassium. A KL zeolite may be cation-exchanged or impregnated with another metal and one or more halides to produce a platinum-impregnated, halided zeolite or a KL supported Pt-halide zeolite catalyst.

In an embodiment, the at least one Group VIII metal is platinum. In another embodiment, the at least one Group VIII metal is platinum and gold. In an embodiment, the at least one Group VIII metal is platinum and rhenium. In an embodiment, the at least one Group VIII metal is platinum. The platinum and optionally one or more halides may be added to the zeolitic support by any suitable method, for example via impregnation with a solution of a platinum-containing compound and one or more halide-containing compounds. For example, the platinum-containing compound can be any decomposable platinum-containing compound. Examples of such compounds include, but are not limited to, ammonium tetrachloroplatinate, chloroplatinic acid, diammineplatinum (II) nitrite, bis-(ethylenediamine) platinum (II) chloride, platinum (II) acetylacetonate, dichlorodiammine platinum, platinum (II) chloride, tetraammineplatinum (II) hydroxide, tetraammineplatinum chloride, and tetraammineplatinum (II) nitrate.

In an embodiment, the catalyst is a zeolitic support with a platinum-containing compound and at least one ammonium halide compound. The ammonium halide compound may comprise one or more compounds represented by the formula $N(R)_4X$, where X is a halide and where R represents a hydrogen or a substituted or unsubstituted carbon chain molecule having 1-20 carbons wherein each R may be the same or different. In an embodiment, R is selected from the group consisting of methyl, ethyl, propyl, butyl, or combinations thereof, more specifically methyl. Examples of suitable ammonium compounds are represented by the formula $N(R)_4X$ include ammonium chloride, ammonium fluoride, and tetraalkylammonium halides such as tetramethylammonium chloride, tetramethylammonium fluoride, tetraethylammonium chloride, tetraethylammonium fluoride, tetrapropylammonium chloride, tetrapropylammonium fluoride, tetrabutylammonium chloride, tetrabutylammonium fluoride, methyltriethylammonium chloride, methyltriethylammonium fluoride, or combinations thereof.

The catalyst can be employed in any of the conventional types or structures known to the art. It may be employed in the form of extrudates, pills, pellets, granules, broken fragments, or various special shapes, disposed within a reaction zone (e.g., in a fixed bed), and the charging stock may be passed therethrough in the liquid, vapor, or mixed phase, and in either upward or downward, or inward or outward flow.

Reforming reactor section 130/230/330 generally comprises a plurality of reactors arranged in series with furnaces located upstream of each reactor, respectively. The combination of a furnace coupled to a downstream reactor may be referred to as a "reactor-furnace pair." The furnaces may comprise any type of furnace capable of raising the temperature of the hydrocarbon stream to achieve the desired inlet temperature to the paired reactor. The temperature may be raised so that the reforming reactions proceed in the subsequent reactors, which is generally needed due to the endothermic nature of the reforming process.

The reforming reactor section 130/230/330 may consist of a plurality of reactor-furnace pairs. In an embodiment, the reforming section 130/230/330 comprises three or more serially connected reactors. All of the reforming reactors can be the same or different in size and/or configuration. In an embodiment, all of the reforming reactors are radial flow reactors, with the hydrocarbon stream passing through the reforming reactors in an inward or an outward flow horizontally across the catalyst bed. In an embodiment, the reactors may be sized according to known techniques, and all of the reforming reactors may be the same size. Alternatively, one or more of the reforming reactors may be different sizes.

In general, the reforming reaction occurs under process conditions that thermodynamically favor the dehydrocyclization reactions and limit undesirable hydrocracking reactions. The reforming reaction in the reforming section 130/230/330 can be carried out using any conventional reforming conditions, and may be carried out at reactor inlet temperatures ranging from about 600° F. (316° C.) to about 1100° F. (593° C.), alternatively from about 650° F. (343° C.) to about 1100° F. (593° C.), alternatively from about 700° F. (371° C.) ° F. to about 1100° F. (593° C.), alternatively from about 800° F. (427° C.) to about 1050° F. (556° C.), alternatively from about 850° F. (454° C.) to about 1050° F. (566° C.). Reaction pressures may range from about atmospheric pressure to about 500 psig (3,447 KPa), alternatively from about 25 psig (172 KPa) to about 300 psig (2,068 KPa), and alternatively from about 30 psig (207 KPa) to about 100 psig (689 KPa). The molar ratio of hydrogen to hydrocarbon in the hydrocarbon stream may be in the range of from about 0.1 and about 10, alternatively from about 0.5 to about 5.0, and alternatively from about 1:1 to about 3:1. The liquid hourly space velocity (LHSV) for the hydrocarbon stream over the aromatization catalyst may be in the range of from about 0.5 to about 20, or alternatively from about 0.50 to about 5.0, based on the catalyst in the reaction zone.

In embodiments, the SGB has a volume that is from about 2 vol. % to about 40 vol. % of the volume of the total reforming catalyst within the plurality of reforming reactors within the reforming section 130/230/330. In some embodiments, the SGB has a volume that is from about 2 vol. % to about 25 vol. %; from about 4 vol. % to about 40 vol. %; from about 5 vol. % to about 13 vol. %; from about 11 vol. % to about 23 vol. %; from about 16 vol. % to about 30 vol. %; from about 6 vol. % to about 22 vol. %; from about 12 vol. % to about 22 vol. % of the volume of the total reforming catalyst within the plurality of reforming reactors within the reforming section 130/230/330. By way of non-limiting example, if a conventional reforming section comprises six reforming reactors, wherein the first, second, third, fourth, fifth, and sixth reactors utilize 10, 10, 10, 20, 20, and 30 volume percent of the total catalyst, respectively, a SGB according to this disclosure may comprise a SGB catalyst in an amount equivalent to from about 7 vol. % to about 10 vol. %; from about 14 vol. % to about 17 vol. %; or from about 20 vol. % to about 23 vol. % of the total reforming catalyst within the series of six reforming reactors.

In embodiments, a SGB according to this disclosure comprises a SGB catalyst layer upstream of a layer comprising the adsorbent capable of adsorbing hydrogen sulfide. For example, in embodiments, a reforming system 100 comprises a second bed or layer 125B of adsorbent capable of adsorbing hydrogen sulfide located downstream of a first bed or layer of the SGB catalyst 125A. The adsorbent capable of adsorbing hydrogen sulfide can be any such adsorbent known to those of skill in the art. In embodiments, the adsorbent layer comprises potassium on alumina.

In embodiments, a SGB according to this disclosure comprises a SGB catalyst layer or bed upstream or downstream of a layer or bed comprising an iron trap material. Such an iron trap layer may prevent particulate iron from moving into furnace tubes or reforming reactors of reforming section 130/230/330 where it could undesirably promote coke formation. Particulate iron, commonly referred as tramp iron, refers to various corrosion by-products from upstream processing and handling. For example, in embodiments, a reforming system 300 comprises a first bed or layer 325A of the iron trap material located upstream of a second bed or layer 325B of the SGB catalyst.

In embodiments, in a reforming system containing an existing SCA comprising a top, upstream, or 'conversion' bed operable to produce hydrogen sulfide from sulfur-containing hydrocarbons, and a bottom, downstream, or 'adsorbent' bed operable to adsorb the hydrogen sulfide and thus prevent it from impacting downstream reforming reactors, the upstream bed is converted to an iron guard bed containing an iron trap material, while the downstream bed of the SCA is replaced with reforming catalyst acting both as a sulfur guard bed and a sulfur adsorbing bed.

In embodiments, the iron trap material is any material known to those of skill in the art to be operable to remove iron particulate from the hydrocarbon feed. In embodiments, the iron trap material comprises an inert or catalytically active ceramic material, a reticulated ceramic material, a high porosity ceramic material, or combinations thereof. In embodiments, the ceramic material used in the iron trap comprises an inert ceramic material which may be present in a number of common forms including spheres, rings, pentarings, and various extrudates with various arrangements of lobes and holes, Reticulated ceramic materials or high porosity ceramic materials have a significant tortuosity and a high internal volume which result in a high trapping efficiency as well as a very large storage capacity for particulate materials. in embodiments, the ceramic material used in the iron trap comprises a reticulated ceramic material. In embodiments, the ceramic material used in the iron trap comprises a high porosity ceramic material. As used herein with reference to the ceramic material, a high porosity means a total porosity of greater than or equal to about 0.2 cc/g. In embodiments, the reticulated ceramic material or high porosity ceramic material used in the iron trap has a porosity in the range of from about 0.1 cc/g to about 4 cc/g, from about 0.2 cc/g to about 3 cc/g, or greater than or equal to about 0.1 cc/g, 0.2 cc/g, or 0.4 cc/g. The spherical ceramic material used in the iron trap may have a diameter in the range of from about ⅛ inch (3 mm) to about 2 inches (51 mm), from about ⅛ inch (3 mm) to about ⅜ inch (10 mm), from about ⅛ inch (3 mm) to about ½ inch (13 mm), or from about ⅛ inch (3 mm) to about ¼ inch (6 mm), The spherical ceramic material used in the iron trap may be packed to a depth in the range of from about 0.5 foot (15 cm) to about 5 feet (152 cm), from about 1 foot (30 cm) to about 5 feet (152 cm), or from about 1 foot (30 cm) to about 3 feet (91 cm) with the remainder of the bed being the SOB catalyst. In some embodiments, the iron trap comprises several sizes of ceramic materials or reticulated ceramics used in a graded bed. The iron trap material may comprise each of the materials, such as an inert or catalytically active spherical ceramic material; a reticulated ceramic material; or a high porosity ceramic material; or a combination thereof. In embodiments, the iron trap material comprises reticulated ceramic materials; high porosity ceramic materials; or combinations thereof. In other embodiments, the iron trap material comprises a reticulated ceramic material or a high porosity ceramic material loaded adjacent to an inlet of the SOB catalyst bed or layer, and a topping ceramic material loaded as the outermost layer of packing (i.e., wherein the reticulated or high porosity ceramic material is positioned between the SOB catalyst and a topping ceramic material), The topping ceramic material used in the iron trap may be inert or catalytically active. In embodiments, the topping ceramic material used in the iron trap has a porosity in the range of from About 0.1 cc/g to about 4 cc/g, from about 0.2 cc/g to about 3 cc/g, or greater than or equal to about 0.1 cc/g, 0.2 cc/g, or 0.4 cc/g. In embodiments, the topping ceramic material used in the iron trap has a diameter in the range of from about ⅛ inch (3 mm) to about 2 inches (51 mm), from about 1 inch (25 mm) to about 1½ inches (38 mm), and/or from about ½ inch (13 mm) to about 1½ inches (38 mm) and may be any shape. In embodiments, the topping ceramic material forms an inlet depth in the range of from about 1 inch (25 mm) to about 24 inches (610 mm), from about 3 inches (76 mm) to about 20 inches (508 mm), or from about 3 inches (76 mm) to about 18 inches (457 mm).

Such an iron trap material, for example, includes, without limitation, MACROTRAP® XPORE 80 guard bed media, available from Saint-Gobain Norpro of Ohio, USA; TK-26 TOPTRAP™ from Haldor Topsoe, UNICAT AFS™ materials, or Axens ACT materials.

In embodiments, each reforming reactor of the plurality of reactors of the reforming section is operated at a higher operating temperature than an operating temperature of the SGB. In embodiments, the operating temperature of the SGB according to this disclosure is less than about 850° F. (454.4° C.), 860° F. (460° C.), 870° F. (465.6° C.), 880° F. (471.1° C.), 890° F. (476.7° C.), 895° F. (479.4° C.), or 900° F. (482.2° C.). In embodiments, the operating temperature of the SGB according to this disclosure is above a temperature below which aromatic species are significantly hydrogenated, e.g., to naphthenes (also referred to as 'cycloalkanes'). For example, in embodiments, the operating temperature of the SGB is greater than or equal to about 600° F. (315.5° C.), 625° F. (329.4° C.), or 650° F. (343.3° C.), 700° F. (371.1° C.), 770° F. (410° C.), or 800° F. (426.7° C.). In embodiments, the operating temperature of the SGB is in the range of from about 775° F. (412.8° C.) to about 900° F. (482.2° C.), from about 775° F. (412.8° C.) to about 875° F. (468.3° C.), or from about 775° F. (412.8° C.) to about 850° F. (454.4° C.). In embodiments, the SGB is operated at a higher temperature than a conventional SCA.

In applications such as those in which a higher temperature is desired within the SGB 120, and an existing reforming system comprises a hot feed/effluent heat exchanger 110B and a cold feed/effluent heat exchanger 110A configured as indicated in the embodiment of FIG. 1, the system may be reconfigured as indicated in the embodiment of FIG. 2, whereby all the feed/effluent heat exchangers (i.e., both the cold feed/effluent heat exchanger 210A and the hot feed/effluent heat exchanger 210B) are prior to the SGB, and thus operable to raise the temperature of the hydrocarbon feed upstream of the SGB 220. Alternatively, in embodiments, the hot feed/effluent heat exchanger 110B may be bypassed. In embodiments, a furnace is positioned/utilized upstream of the SGB reactor, to heat the inlet hydrocarbon feed thereto.

A method of reforming according to this disclosure may further comprise loading a replacement reforming catalyst in one or more reactors of the plurality of reactors within the reforming section and loading a replacement SGB catalyst in the SGB, and co-reducing the replaced SGB catalyst in the SGB with the replaced reforming catalyst in the one or more reactors of the plurality of reactors within the reforming section. In some embodiments, co-reducing comprises reducing the replacement SGB catalyst at a lower temperature than a lowest temperature at which the reforming catalyst of the plurality of reactors is reduced within the reforming section. Utilizing the same catalyst in the reforming reactors and the SGB, in embodiments of this disclosure, enables co-reduction of the replaced SGB catalyst and the replaced reforming catalyst in the reforming reactor(s). Such co-reduction may save substantial turnaround time. In embodiments, the SGB catalyst is reduced at a lower temperature than a lowest temperature at which the reforming catalyst of the plurality of reforming reactors is reduced. In embodiments, the SGB catalyst is reduced at a temperature of less than or equal to about 550° F. (287.8° C.), 700° F. (371.1° C.), or 900° F. (482.2° C.).

In embodiments, a spent reforming catalyst removed from a downstream reforming reactor of reforming section 130/230/330 is utilized as a replacement SGB catalyst. In embodiments, after replacing the spent reforming catalyst in one or more of the reforming reactors of the plurality of reactors within the reforming section with replacement reforming catalyst, the spent reforming catalyst is utilized as the replacement SGB catalyst in the SGB. In embodiments, the spent reforming catalyst utilized in the SGB is extracted from any one or more of the reforming reactors. In embodiments, the spent reforming catalyst utilized as the replacement SGB catalyst in the SGB is removed from a reforming reactor between a first reforming reactor in the reforming section and a last reforming reactor in the reforming section. In embodiments, the spent reforming catalyst utilized as the replacement SGB catalyst in the SGB is removed from a penultimate reforming reactor, an antepenultimate reforming reactor, or both the penultimate reforming reactor and the antepenultimate reforming reactor of the plurality of reactors in the reforming section.

A method of reforming a hydrocarbon feed according to this disclosure may further comprise monitoring the change in temperature (i.e., the 'delta temperature') across the SGB 120/220/320, The SOB delta temperature is the difference between a temperature of the hydrocarbon feed introduced to the SOB 120/220/320 via line 115/217/315, respectively, and the temperature of the treated hydrocarbon stream in the SOB outlet line 116/216/316, respectively, to monitor an activity of the SOB catalyst. Monitoring of the SOB delta temperature may further comprise monitoring a rate of change of the SOB delta temperature to monitor a loading of the SOB catalyst with one or more undesirable compounds. The undesirable compound may comprise sulfur, sulfur-containing hydrocarbons, nitrogen compounds, heavies comprising hydrocarbons having more than 10 carbons, or a combination thereof. Monitoring of the SOB delta temperature may further comprise monitoring a SOB endotherm, wherein the SOB endotherm is a difference between a temperature of the hydrocarbon feed introduced to the SGB 120/220/320 via line 115/217/315, respectively, and the temperature of the treated hydrocarbon stream in the SOB outlet line 116/216/316, respectively, to monitor an activity of the SOB catalyst, in this manner, utilization of reforming catalyst in the SGB 120/220/320 may enable facile monitoring of the loading of sulfur and/or another poison within the SGB 120/220/320.

The system and method of this disclosure may provide substantial benefits in terms of turnaround time. In embodiments, a method of this disclosure comprises operating a reforming system to convert hydrocarbons in the treated hydrocarbon stream into a reactor effluent containing, aromatic hydrocarbons until identifying one or more operating parameters that indicate a need to shut down the reforming system. For example, during the operation of the reforming system, at least one reactor may be deemed to have an operational issue for which the reforming system needs to be shut down. In an embodiment, the nature of the operational issue may comprise a decrease in catalytic activity or selectivity over time. A catalyst that exhibits an unacceptably low catalytic performance compared to an initial catalytic performance can be described as a "spent" catalyst. In an embodiment, the nature of the operational issue may comprise inspection and/or servicing of the reactor containing the catalyst. In another embodiment, the nature of the operational issue may comprise inspection and/or servicing of the safety systems associated with the reactor containing the catalyst. In an embodiment, the operational issue may be based on operational considerations, economic considerations, catalyst performance, or any combination thereof.

In an embodiment, the reforming catalyst used in the reforming process may experience a decrease in catalytic activity or selectivity over time. The resulting deactivation of the catalyst can result from a number of mechanisms including, but not limited to, coking, poisoning, and/or loss of catalytic material or components. As used herein, the term "coke" refers to a carbon-rich carbonaceous material, generally having a carbon to hydrogen ratio greater than one. The term "coking" refers to the process of depositing coke on a surface. Both the term "coke" and "coking" as used herein are meant to include the conventional meaning known in the art. A catalyst that exhibits an unacceptably low catalytic performance compared to an initial catalytic performance can be described as a "spent" catalyst. In an embodiment, a catalyst can be deemed a spent catalyst when the catalytic activity is less than or equal to about 50%, alternatively about 40%, alternatively about 30%, alternatively about 20%, or alternatively about 10% of the initial catalytic activity of the catalyst when initially placed into service. In an embodiment, a catalyst can be deemed a spent catalyst when the catalytic selectivity as measured by methane production is more than or equal to about 150% of the catalyst when initially placed into service. In an embodiment, a catalyst may be deemed to be a spent catalyst based on catalyst performance, alone or in combination with operational considerations, and/or economic considerations. For example, the catalyst may be deemed to be spent when the income attributable to an improved conversion efficiency, and thus an increased product yield, as a result of replacing the catalyst outweighs the expense of replacing the catalyst.

The method may comprise, upon identifying the one or more operating parameters that indicate a need to shut down the reforming system, shutting down the reforming system to cease conversion of the hydrocarbons in the treated hydrocarbon stream into the aromatic hydrocarbons, and removing and replacing the reforming catalyst in one or more of the plurality of reactors containing the spent reforming catalyst, and removing and replacing the SGB catalyst in the SGB. As the SGB catalyst comprises the same reforming catalyst as the reforming reactors, the method may further comprise concurrently reducing the replaced SGB catalyst and the fresh reforming catalyst prior to start-up of the reforming system. The reforming system may subsequently be restarted to continue conversion of the hydrocarbons in the treated hydrocarbon stream into the aromatic hydrocarbons.

In embodiments, the spent reforming catalyst is removed from at least one of the reforming reactors in the plurality of reactors within the reforming section during shutdown, and the SGB catalyst is replaced with the spent reforming catalyst removed from the at least one of the reforming reactors in the plurality of reactors. The spent reforming catalyst utilized as the replacement SGB catalyst may be removed from any of the downstream reforming reactors. In embodiments, the spent reforming catalyst is removed from a middle reforming reactor, i.e., from a reforming reactor between the first reforming reactor and the last reforming reactor in the reforming section. In embodiments, the spent reforming catalyst is removed from at least one of the penultimate and antepenultimate reforming reactors. In embodiments, spent catalyst is not utilized in the SGB, and the removed SGB catalyst is replaced with fresh reforming catalyst during shutdown. In embodiments, the SGB replacement catalyst comprises a mixture of the spent reforming catalyst and fresh reforming catalyst.

In embodiments, the reforming method further comprises adding a layer or bed of the iron trap material upstream of the SGB catalyst prior to the step of concurrently reducing.

The spent reforming catalyst may be regenerated, rejuvenated, or otherwise reconditioned as known in the art prior to or subsequent to introduction into the SGB as the replacement SGB catalyst. For example, in embodiments, spent catalyst is regenerated and/or rejuvenated as described in U.S. Pat. Nos. 8,716,161; 8,912,108; or 9,085,736, the disclosure of each of which is hereby incorporated herein by reference in its entirety for all purposes not contrary to this disclosure.

As noted hereinabove, it has been unexpectedly discovered that many benefits related to reforming processes, such as the AROMAX® Process, can be realized via utilization of a fresh or a spent reforming catalyst as a sulfur removal material as described herein.

According to this disclosure, a reforming catalyst is utilized in a SGB of a reforming system. The reforming catalyst may be employed as an upstream or conversion bed, which converts sulfur-containing hydrocarbons in a hydrocarbon feed into hydrogen sulfide, upstream of an adsorbent bed which adsorbs the produced hydrogen sulfide. In embodiments, therefor, a SGB catalyst bed or layer is upstream from a downstream adsorbent bed or layer. However, it is envisioned that, in embodiments, the reforming catalyst operates as both the conversion bed and the adsorbent bed, and the SGB comprises reforming catalyst, with no further downstream adsorbent bed. For example, the platinum functionality of the AROMAX® Catalyst can act as the sulfur converter, thus promoting the formation of hydrogen sulfide from sulfur containing hydrocarbons in the hydrocarbon feed.

As upstream treatment of the hydrocarbon feed to be reformed (e.g., an upstream naphtha hydrotreater) may operate to remove sulfur and sulfur-containing hydrocarbons to desirable levels for the hydrocarbon feed during typical operations, in embodiments according to this disclosure, the SGB may function as an additional reforming reactor, thus significantly debottlenecking the plant. However, if the sulfur content in the hydrocarbon feed should be unacceptably high, the reforming catalyst in the SGB would operate to remove sulfur, and protect the downstream reforming reactors. Moreover, without wishing to be limited by theory, as the SGB according to this disclosure may be operable at a higher temperature, sulfur-removal in the SGB may not promote the formation of cycloalkanes, and, thus, the first downstream reforming reactor may be operable to aromatize more paraffins (e.g., greater capacity), as the degree of naphthene dehydrogenation effected by the first downstream reforming reactor may be reduced. This may also result in increased plant capacity, and/or a reduction in heat duty (e.g., on a furnace of the second downstream furnace/reactor pair).

In embodiments, an existing reforming system comprises feed/effluent heat exchangers, designed to adjust the temperature of the hydrocarbon feed, both before and after the sulfur removal apparatus, as indicated in the embodiment of FIG. 1. As such a design may limit the SGB reactor temperature, and higher temperatures may be desirable when utilizing reforming catalyst in the SGB as described herein, since the reforming catalyst generally does not promote cracking at these conditions, in embodiments, an existing plant is retrofitted for operation as described herein. For example, as noted above, a retrofit may be designed such that the feed/effluent heat exchanger(s) is (are) prior to the SGB (as depicted in the embodiments of FIGS. 2 and 3). For example, a reforming system may be reconfigured such that both the hot feed/effluent heat exchanger and the cold feed/effluent heat exchanger are prior to the SGB, as discussed hereinabove with reference to the embodiment of FIG. 2. A grassroots plant may be designed with a larger, single heat exchanger prior to the SGB (as depicted in the embodiment of FIG. 3). Such configurations may enable temperatures of about 770° F. (410° C.) or higher in the SGB, thus pushing equilibrium values towards unsaturated compounds. In embodiments, a furnace is included upstream of the SGB to heat the inlet hydrocarbon feed thereto.

As noted hereinabove, utilizing reformer catalyst in the SGB may substantially reduce turnaround time, as the catalyst of the SGB (i.e., reforming catalyst) can be co-reduced with the rest of the plant. Additionally, as the SGB is operable at lower temperatures than the downstream reforming reactors, and is to be used for sulfur protection, a spent reforming catalyst may be employed in the SGB, in embodiments, thus potentially providing savings on catalyst manufacturing costs.

Another aspect of this disclosure is the utilization of a SGB comprising an iron guard bed comprising an iron trap material layer in addition to the SGB catalyst layer or bed. In retro-fit embodiments, the top or upstream part of an existing SCA bed, which typically comprises catalyst operable to convert sulfur-containing hydrocarbons in the hydrocarbon feed into hydrogen sulfide, is converted into an iron guard bed comprising an iron trap material. Incorporation of such an iron guard bed could prevent particulate iron from moving through into downstream furnace tubes or reforming reactors where it could undesirably promote coke formation or otherwise increase the pressure drop. In some such embodiments, the bottom part of an existing SCA, which conventionally contains catalyst operable to adsorb hydrogen sulfide, is replaced with reforming catalyst acting as a sulfur guard. Iron particulates under reforming conditions may produce coke; undesirably increase cracking reactions; and/or increase the generation of methane in the reforming reactors. The ability to co-reduce the SGB with the downstream reforming reactors (i.e., and not have to bypass a conventional SCA, which can stir up particulates, during the entire oxidation/reduction cycle(s)), and the presence of an iron guard bed in the SGB may result in reduced coking and/or pressure drop issues related to particulate iron.

To further illustrate various illustrative embodiments of the present disclosure, the following examples are provided.

EXAMPLES

The disclosure having been generally described, the following example is given as a particular embodiment of the disclosure and to demonstrate the practice and advantages thereof. It is understood that the example is given by way of illustration and is not intended to limit the specification or the claims in any manner.

Example 1

Figure 4:
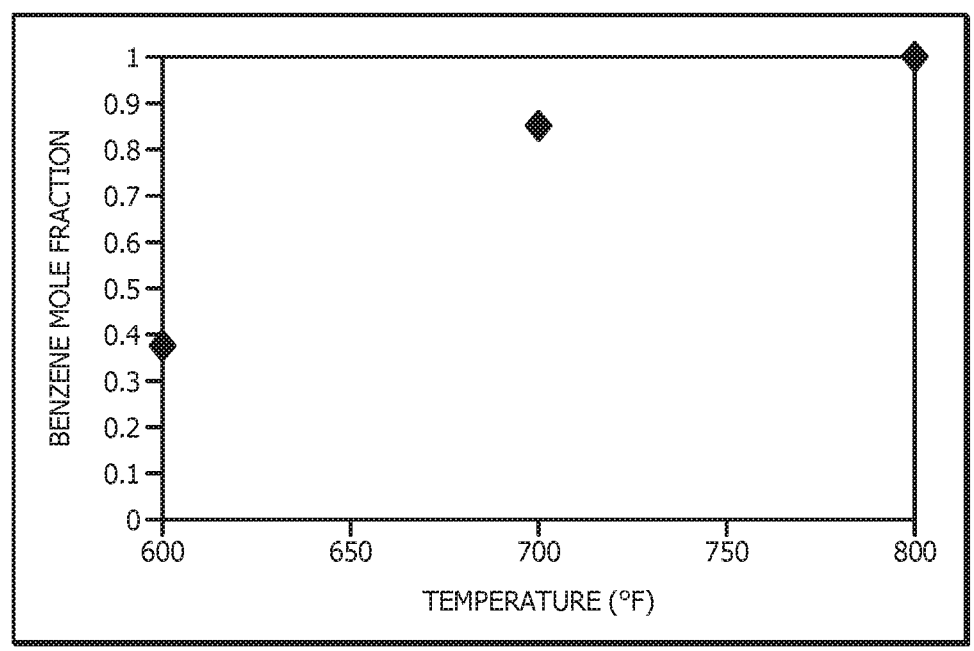
FIG. 4 is a graphical representation of equilibrium values of benzene as a function of temperature obtained for the cyclohexane/benzene mixture of Example 1.

Thermodynamics for the dehydrogenation of naphthenes is highly sensitive to temperature. An Aspen Plus simulation was performed to determine what the equilibrium concentrations would be if a treated hydrocarbon stream comprising 1:1:2 molar ratios of cyclohexane:benzene:hydrogen was introduced, at a pressure of 100 psig (690 KPa), to an AROMAX® Catalyst as described herein. FIG. 4 is a plot of the equilibrium benzene fraction as a function of temperature obtained for the cyclohexane/benzene mixture. As the benzene fraction approaches one at temperatures approaching 800° F. (427° C.), it may be desirable to use a higher operating temperature in a SGB than the temperature in a conventional SCA when utilizing such AROMAX® Catalyst, since the AROMAX® Catalyst promotes cracking to a lesser extent than a conventional SCA catalyst at these higher temperatures.

Additional Embodiments

The particular embodiments disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. Alternative embodiments that result from combining, integrating, and/or omitting features of the embodiment(s) are also within the scope of the disclosure. While compositions and methods are described in broader terms of "having", "comprising," "containing," or "including" various components or steps, the compositions and methods can also "consist essentially of" or "consist of" the various components and steps. Use of the term "optionally" with respect to any element of a claim means that the element is required, or alternatively, the element is not required, both alternatives being within the scope of the claim.

Numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an", as used in the claims, are defined herein to mean one or more than one of the element that it introduces. If there is any conflict in the usages of a word or term in this specification and one or more patent or other documents, the definitions that are consistent with this specification should be adopted.

The following are nonlimiting, specific embodiments in accordance with the present disclosure:

A: A process for operating a reforming system, the process comprising: operating a reforming section, wherein the reforming section comprises a plurality of reactors, and wherein each of the plurality of reactors contains a reforming catalyst capable of catalyzing the conversion of at least a portion of the hydrocarbons in a treated hydrocarbon stream into a reactor effluent comprising aromatic hydrocarbons; and operating a sulfur guard bed (SGB) to remove sulfur and sulfur-containing hydrocarbons from a hydrocarbon feed to provide the treated hydrocarbon stream, wherein the SGB contains at least a layer of a SGB catalyst, wherein the layer of the SGB catalyst comprises the same catalyst as the reforming catalyst and is capable of producing hydrogen sulfide from sulfur-containing hydrocarbons and hydrogen, wherein each reactor of the plurality of reactors within the reforming section is operated at a higher operating temperature than an operating temperature of the SGB.

B: A reforming system comprising: a reforming section, wherein the reforming section comprises a plurality of reactors, and wherein each of the plurality of reactors contains a reforming catalyst capable of catalyzing the conversion of at least a portion of the hydrocarbons in a treated hydrocarbon stream into a reactor effluent comprising aromatic hydrocarbons; and a sulfur guard bed (SGB) operable to remove sulfur and sulfur-containing hydrocarbons from a hydrocarbon feed to provide the treated hydrocarbon stream, wherein the SGB contains at least a layer of a SGB catalyst, wherein the SGB catalyst is the same catalyst as the reforming catalyst and is capable of producing hydrogen sulfide from sulfur-containing hydrocarbons and hydrogen, and wherein the SGB has a volume that is from about 2 vol. % to about 40 vol. % of the volume of the total reforming catalyst within the plurality of reforming reactors within the reforming section.

C: A process for operating a reforming system comprising a reforming section, wherein the reforming section comprises a plurality of reactors, and wherein each of the plurality of reactors contains a reforming catalyst capable of catalyzing the conversion of at least a portion of the hydrocarbons in a treated hydrocarbon stream into a reactor effluent comprising aromatic hydrocarbons; and a sulfur guard bed (SGB) operable to remove sulfur and sulfur-containing hydrocarbons from a hydrocarbon feed to provide the treated hydrocarbon stream, wherein the SGB contains at least a layer of a SGB catalyst that is the same catalyst as the reforming catalyst, the process comprising: operating the reforming system to convert hydrocarbons in the treated hydrocarbon stream into the reactor effluent containing aromatic hydrocarbons; upon identifying one or more operating parameters that indicate a need to perform maintenance on the reactor system, shutting down the reforming system to cease conversion of the hydrocarbons in the treated hydrocarbon stream into the aromatic hydrocarbons; removing and replacing the reforming catalyst in the plurality of reactors and removing and replacing the SGB catalyst in the SGB; concurrently reducing the replaced SGB catalyst and the fresh reforming catalyst prior to start-up of the reforming system; and starting up the reforming system to continue conversion of the hydrocarbons in the treated hydrocarbon stream into the aromatic hydrocarbons.

Each of embodiments A, B, and C may have one or more of the following additional elements: Element 1: wherein the SGB further contains a layer of an adsorbent, wherein the adsorbent is capable of adsorbing hydrogen sulfide. Element 2: wherein the layer of the adsorbent is located downstream of the layer of the SGB catalyst. Element 3: wherein the operating temperature of the SGB is less than about 900° F. (482° C.). Element 4: wherein the operating temperature of the SGB is above a temperature below which aromatic species are hydrogenated to naphthenes. Element 5: wherein the operating temperature of the SGB is greater than about 600° F. (315.5° C.), 700° F. (371.1° C.), 770° F. (410° C.), or 800° F. (426.7° C.). Element 6: wherein the operating temperature of the SGB is in the range of from about 775° F. (412.8° C.) to about 850° F. (454.4° C.). Element 7: further comprising removing a spent reforming catalyst from at least one of the reforming reactors in the plurality of reactors within the reforming section; and loading of a replacement reforming catalyst in one or more reactors of the plurality of reactors within the reforming section. Element 8: further comprising loading a replacement SGB catalyst in the SGB, co-reducing the replacement SGB catalyst in the SGB with the replacement reforming catalyst in the plurality of reactors within the reforming section. Element 9: wherein co-reducing comprises reducing the SGB catalyst at a lower temperature than a lowest temperature at which the reforming catalyst of the plurality of reactors is reduced within the reforming section. Element 10: wherein the SGB catalyst is reduced at a temperature of less than or equal to about 900° F. (482.2° C.). Element 11: wherein the SGB further comprises a layer of an iron trap material operable to remove particulate iron from the hydrocarbon feed. Element 12: wherein the iron trap material is located upstream of the layer of the SGB catalyst. Element 13: wherein the iron trap material comprises an inert or catalytically active spherical ceramic material; a reticulated ceramic material; a high porosity ceramic material; or a combination thereof. Element 14: wherein the reforming catalyst comprises at least one Group VIII metal and a zeolitic support. Element 15: wherein the Group VIII metal comprises platinum, alone or in combination with one or more of gold or rhenium, and wherein the zeolitic support comprises a silica-bound L-zeolite. Element 16: wherein the reforming catalyst further comprises at least one halogen. Element 17: wherein the SGB catalyst comprises from about 10 weight percent to about 20 weight percent $K_2O$. Element 18: further comprising exchanging heat between the reactor effluent and the hydrocarbon feed to help maintain the SGB operating temperature. Element 19: further comprising utilizing a furnace upstream of the SGB to help maintain the SGB operating temperature. Element 20: further comprising monitoring the delta temperature across the SGB to monitor a loading or activity of the SGB catalyst. Element 21: wherein monitoring the SGB delta temperature further comprises monitoring a rate of change of the SGB delta temperature to monitor a loading of one or more undesirable compounds selected from the group consisting of sulfur, sulfur-containing hydrocarbons, nitrogen compounds, heavies comprising hydrocarbons having more than ten carbons, or combinations thereof. Element 22: wherein monitoring the SGB delta temperature further comprises monitoring a SGB endotherm, wherein the SGB endotherm is a difference between a temperature of the hydrocarbon feed provided to the SGB and the SGB outlet temperature (or treated hydrocarbon stream temperature) to monitor an activity of the SGB catalyst. Element 23: further comprising, after replacing a spent reforming catalyst in one or more reactors of the plurality of reactors within the reforming section with replacement reforming catalyst, using the spent reforming catalyst as the SGB catalyst in the SGB. Element 24: wherein the spent reforming catalyst is extracted from the penultimate reforming reactor, the antepenultimate reforming reactor, or both the penultimate reforming reactor and the antepenultimate reforming reactor of the plurality of reactors in the reforming section. Element 25: wherein the SGB has a volume that is from about 2 vol. % to about 25 vol. % of the volume of the total reforming catalyst within the plurality of reforming reactors within the reforming section. Element 26: wherein the iron trap material comprises a reticulated ceramic material or a high porosity ceramic material loaded adjacent to an inlet of the SGB catalyst bed, and a topping ceramic material loaded as the outermost layer of packing of the SGB. Element 27: wherein the spherical ceramic material; the reticulated ceramic material; the high porosity ceramic material; or combinations thereof is inert or catalytically active, has a diameter in the range of from ⅛ inch (3 mm) to ⅜ inch (10 mm), forms a depth of from about 1 foot (30 cm) to about 3 feet (91 cm), or a combination thereof. Element 28: wherein the ceramic material is reticulated, is high porosity, has a diameter in the range of from about ½ inch (13 mm) to about 1½ inches (38 mm), forms an inlet depth in the range of from about 3 inches (8 cm) to about 18 inches (46 cm), or a combination thereof. Element 29: wherein removing and replacing the reforming catalyst in the plurality of reactors and removing and replacing the SGB catalyst in the SGB further comprises removing a spent reforming catalyst from at least one of the reforming reactors in the plurality of reactors, and replacing the SGB catalyst with the spent reforming catalyst removed from the at least one of the reforming reactors in the plurality of reactors. Element 30: wherein the at least one of the reforming reactors in the plurality of reactors from which the spent reforming catalyst is removed is at least one of the penultimate and antepenultimate reforming reactors. Element 31: wherein removing and replacing the reforming catalyst in the plurality of reactors and removing and replacing the SGB catalyst in the SGB comprises removing and replacing the reforming catalyst and the SGB catalyst with fresh reforming catalyst. Element 32: further comprising adding a layer of an iron trap material upstream of the layer of the SGB catalyst prior to the step of concurrently reducing. Element 33: wherein the SGB catalyst is capable of producing hydrogen sulfide from sulfur-containing hydrocarbons and hydrogen. Element 34: wherein the SGB has a volume that is from about 2 vol. % to about 40 vol. % of the volume of the total reforming catalyst within the plurality of reforming reactors within the reforming section.

While preferred embodiments of the invention have been shown and described, modifications thereof can be made by one skilled in the art without departing from the teachings of this disclosure. The embodiments described herein are exemplary only, and are not intended to be limiting. Many variations and modifications of the invention disclosed herein are possible and are within the scope of the invention.

Numerous other modifications, equivalents, and alternatives, will become apparent to those skilled in the art once the above disclosure is fully appreciated. It is intended that the following claims be interpreted to embrace all such modifications, equivalents, and alternatives where applicable. Accordingly, the scope of protection is not limited by the description set out above but is only limited by the claims which follow, that scope including all equivalents of the subject matter of the claims. Each and every claim is incorporated into the specification as an embodiment of the present invention. Thus, the claims are a further description and are an addition to the detailed description of the present invention. The disclosures of all patents, patent applications, and publications cited herein are hereby incorporated by reference.

What is claimed is:

1. A process for operating a reforming system, the process comprising:

operating a reforming section, wherein the reforming section comprises a plurality of reactors, and wherein each of the plurality of reactors contains a reforming catalyst capable of catalyzing the conversion of at least a portion of the hydrocarbons in a treated hydrocarbon stream into a reactor effluent comprising aromatic hydrocarbons, wherein the reforming catalyst comprises at least one Group VIII metal and a zeolitic support; and operating a sulfur guard bed (SGB) to remove sulfur and sulfur-containing hydrocarbons from a hydrocarbon feed to provide the treated hydrocarbon stream, wherein the SGB comprises
  1) A volume from about 16 vol. % to about 30 vol. % of the volume of a total reforming catalyst within the plurality of reactors within the reforming section and operable to remove sulfur, and sulfur-containing hydrocarbons from a hydrocarbon feed to provide the treated hydrocarbon stream,
  2) at least a layer of a SGB catalyst and a layer of an iron trap material having a porosity of greater than or equal to about 0.2 cc/g and located downstream of and adjacent to the layer of the SGB catalyst and operable to remove particulate iron from the hydrocarbon feed, where the SGB catalyst and the reforming catalyst are the same and capable of producing hydrogen sulfide from sulfur-containing hydrocarbons and hydrogen, and
  3) an inlet line to introduce the hydrocarbon feed into the SGB and an outlet line to remove the treated hydrocarbon stream from the SGB;

monitoring a SGB endotherm, wherein the SGB endotherm is the difference between the temperature of a hydrocarbon feed introduced to the SGB via the inlet line and the temperature of the treated hydrocarbon in the SGB outlet line; and wherein each reactor of the plurality of reactors of the reforming section is operated at a higher operating temperature than an operating temperature of the SGB, wherein the operating temperature of the SGB is greater than or equal to 800° F. (426.7° C.) and wherein the treated hydrocarbon stream comprises at least one aliphatic hydrocarbon, at least one aromatic hydrocarbon, and hydrogen at a ratio of 1:1:2.

2. The process of claim 1, wherein the operating temperature of the SGB is less than 900° F. (482° C.) and is above a temperature below which aromatic species are hydrogenated to naphthenes.

3. The process of claim 1, further comprising shutting down the reforming system; removing a spent reforming catalyst from at least one of the reforming reactors in the plurality of reactors within the reforming section; and loading of a replacement reforming catalyst in one or more reactors of the plurality of reactors within the reforming section.

4. The process of claim 3, further comprising loading a replacement SGB catalyst in the SGB, and co-reducing the replacement SGB catalyst in the SGB with the replacement reforming catalyst in the plurality of reactors within the reforming section.

5. The process of claim 3, wherein co-reducing comprises reducing the replacement SGB catalyst at a lower temperature than a lowest temperature at which the reforming catalyst of the plurality of reactors is reduced within the reforming section.

6. The process of claim 3, further comprising loading and utilizing the spent reforming catalyst in the SGB as the SGB catalyst.

7. The process of claim 1, further comprising exchanging heat between the reactor effluent and the hydrocarbon feed via a hot feed/effluent heat exchanger downstream of the SGB to help maintain the higher operating temperature.

8. A process for operating a reforming system comprising: a reforming section, wherein the reforming section comprises a plurality of reactors, and wherein each of the plurality of reactors contains a reforming catalyst capable of catalyzing the conversion of at least a portion of the hydrocarbons in a treated hydrocarbon stream into a reactor effluent comprising aromatic hydrocarbons; and a sulfur guard bed (SGB) comprising
1) A volume from about 16 vol. % to about 30 vol. % of the volume of a total reforming catalyst within the plurality of reactors within the reforming section and operable to remove sulfur, and sulfur-containing hydrocarbons from a hydrocarbon feed to provide the treated hydrocarbon stream,
2) at least a layer of a SGB catalyst and a layer of an iron trap material having a porosity of greater than or equal to about 0.2 cc/g and located downstream of and adjacent to the layer of the SGB catalyst and operable to remove particulate iron from the hydrocarbon feed, where the SGB
catalyst and the reforming catalyst are the same and capable of producing hydrogen sulfide from sulfur-containing hydrocarbons and hydrogen, and
3) an inlet line to introduce the hydrocarbon feed into the SGB and an outlet line to remove the treated hydrocarbon stream from the SGB;
the process comprising:
operating the reforming system to convert hydrocarbons in the treated hydrocarbon stream into the reactor effluent comprising the aromatic hydrocarbons;
identifying one or more operating parameters that indicate a need to perform maintenance on the reforming system comprising monitoring the temperature difference between the temperature of the hydrocarbon feed introduced to the SGB and the temperature of the treated hydrocarbon stream in the SGB outlet line,
shutting down the reforming system to cease conversion of the hydrocarbons in the treated hydrocarbon stream into the aromatic hydrocarbons;
removing and replacing the reforming catalyst in the plurality of reactors with a fresh reforming catalyst and removing and replacing the SGB catalyst in the SGB with a replaced SGB catalyst;
adding the layer of the iron trap material upstream of the layer of the SGB catalyst;
concurrently reducing the replaced SGB catalyst and the fresh reforming catalyst prior to start-up of the reforming system; and
starting up the reforming system to continue conversion of the hydrocarbons in the treated hydrocarbon stream into the aromatic hydrocarbons;
wherein the treated hydrocarbon stream comprises at least one aliphatic hydrocarbon, at least one aromatic hydrocarbon, and hydrogen at a ratio of 1:1:2.

9. The process of claim 8, wherein removing and replacing the reforming catalyst in the plurality of reactors and removing and replacing the SGB catalyst in the SGB further comprises removing a spent reforming catalyst from at least one of the reforming reactors in the plurality of reactors, and replacing the SGB catalyst with the spent reforming catalyst removed from the at least one of the reforming reactors in the plurality of reactors.

10. The process of claim 9, wherein the at least one of the reforming reactors in the plurality of reactors from which the spent reforming catalyst is removed is a penultimate reforming reactor, an antepenultimate reforming reactor or both the penultimate reforming reactor and the antepenultimate reforming reactor of the plurality of reactors.

11. The process of claim 8, wherein removing and replacing the reforming catalyst in the plurality of reactors and removing and replacing the SGB catalyst in the SGB comprises removing and replacing the reforming catalyst and the SGB catalyst with the fresh reforming catalyst.

12. The process of claim 1, wherein the SGB has a volume that is from about 20 vol. % to about 23 vol. % of the volume of a total reforming catalyst within the plurality of reactors within the reforming section.

13. The process of claim 8, wherein the SGB is operated at a temperature less than an operating temperature of each reactor of the plurality of reactors of the reforming section.

14. The process of claim 1, further comprising monitoring the delta temperature across the SGB to monitor a loading or activity of the SGB catalyst.

15. The process of claim 14, wherein monitoring the SGB delta temperature further comprises monitoring a rate of change of the SGB delta temperature to monitor a loading of one or more undesirable compounds selected from the group consisting of sulfur, sulfur-containing hydrocarbons, nitrogen compounds, heavies comprising hydrocarbons having more than ten carbons, or combinations thereof.

16. The process of claim 14, wherein monitoring the SGB delta temperature further comprises monitoring a SGB endotherm, wherein the SGB endotherm is a difference between a temperature of the hydrocarbon feed provided to the SGB and the SGB outlet temperature and/or treated hydrocarbon stream temperature, to monitor an activity of the SGB catalyst.

17. The process of claim 1, wherein the reforming catalyst further comprises from about 10 weight percent to about 20 weight percent $K_2O$.

18. The process of claim 8, wherein the layer of the iron trap material comprises a reticulated ceramic.

19. The process of claim 1, wherein the layer of the iron trap material comprises a reticulated ceramic.

20. The process of claim 1, wherein the at least one aliphatic hydrocarbon comprises cyclohexane, and the at least one aromatic hydrocarbon comprises benzene.

* * * * *